US011030890B2

(12) United States Patent
Werner et al.

(10) Patent No.: US 11,030,890 B2
(45) Date of Patent: Jun. 8, 2021

(54) LOCAL DRIVER PATTERN BASED NOTIFICATIONS

(71) Applicant: INTERNATIONAL BUSINESS MACHINES CORPORATION, Armonk, NY (US)

(72) Inventors: John S. Werner, Fishkill, NY (US); Ali Y. Duale, Poughkeepsie, NY (US); Louis P. Gomes, Poughkeepsie, NY (US); Arkadiy O. Tsfasman, Wappingers Falls, NY (US); Shailesh R. Gami, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 401 days.

(21) Appl. No.: 15/969,971

(22) Filed: May 3, 2018

(65) Prior Publication Data

US 2019/0340920 A1 Nov. 7, 2019

(51) Int. Cl.

*G08G 1/017* (2006.01)
*G08G 1/052* (2006.01)
(Continued)

(52) U.S. Cl.

CPC ........... *G08G 1/017* (2013.01); *G08G 1/0129* (2013.01); *G08G 1/0133* (2013.01); *G08G 1/048* (2013.01); *G08G 1/052* (2013.01)

(58) Field of Classification Search

CPC .... G08G 1/017; G08G 1/0129; G08G 1/0133; G08G 1/048; G08G 1/052
See application file for complete search history.

(56) References Cited

U.S. PATENT DOCUMENTS 5,089,963 A 2/1992 Takahashi
6,216,086 B1 4/2001 Seymour et al.
(Continued)

FOREIGN PATENT DOCUMENTS

WO 9002388 3/1990
WO 2017100780 A1 6/2017

OTHER PUBLICATIONS

Ceikute, Vaida et al., "Routing Service Quality—Local Driver Behavior Versus Routing Services", 2013 IEEE 14th International Conference on Mobile Data Management, pp. 97-106.
(Continued)

*Primary Examiner* — Nicholas Kiswanto
(74) *Attorney, Agent, or Firm* — Cantor Colburn LLP; Teddi Maranzano

(57) ABSTRACT

Methods, systems and computer program products for providing notifications to drivers based on observed local driver patterns are provided. Aspects include storing a number of times that each driver travels across a road segment and classifying the drivers as local drivers for the road segment if the number of times the driver traversed the road segment is greater than a threshold number. Aspects also include determining an expected driving pattern for the road segment. Based on a determination that a local driver deviated from the expected driving pattern, aspects include storing an indication of how the local driver deviated from the expected driving pattern and a condition at that time. Based on a determination that greater than a threshold percentage of local drivers deviated from the expected driving pattern, aspects include notifying a driver traversing the road segment of a variant driving pattern for the road segment.

18 Claims, 7 Drawing Sheets

(51) Int. Cl.
*G08G 1/01* (2006.01)
*G08G 1/048* (2006.01)

(56) References Cited

U.S. PATENT DOCUMENTS

| | | | | |
|---|---|---|---|---|
| 6,321,161 | B1 | 11/2001 | Herbst et al. | |
| 6,405,130 | B1 | 6/2002 | Piwowarski | |
| 7,512,487 | B1 | 3/2009 | Golding et al. | |
| 7,751,945 | B2 | 7/2010 | Obata | |
| 7,881,861 | B2 * | 2/2011 | Kravets | G01C 21/3484 701/416 |
| 8,024,114 | B2 | 9/2011 | Doyle | |
| 8,185,304 | B2 * | 5/2012 | Insolia | G01C 21/3484 701/410 |
| 8,412,445 | B2 | 4/2013 | Uyeki | |
| 8,508,353 | B2 | 8/2013 | Cook et al. | |
| 8,700,296 | B2 | 4/2014 | Chapman et al. | |
| 8,825,395 | B2 | 9/2014 | Boss et al. | |
| 9,002,635 | B2 * | 4/2015 | Trum | G01C 21/32 701/424 |
| 9,132,773 | B2 * | 9/2015 | Washlow | B60Q 9/00 |
| 9,254,824 | B2 | 2/2016 | Ko et al. | |
| 9,261,377 | B2 | 2/2016 | Krzanowski et al. | |
| 9,792,575 | B2 * | 10/2017 | Khasis | G08G 1/0116 |
| 9,952,056 | B2 * | 4/2018 | Khasis | G06Q 10/047 |
| 10,262,530 | B2 * | 4/2019 | Bradley | G08G 1/096741 |
| 10,690,508 | B2 * | 6/2020 | Werner | G01C 21/28 |
| 2002/0120396 | A1 | 8/2002 | Boies et al. | |
| 2006/0173618 | A1 | 8/2006 | Eyer et al. | |
| 2006/0265124 | A1 * | 11/2006 | Ohler | G01C 21/3691 701/423 |
| 2009/0287405 | A1 | 11/2009 | Liu et al. | |
| 2011/0087429 | A1 * | 4/2011 | Trum | G01C 21/3617 701/533 |
| 2011/0137551 | A1 | 6/2011 | Peri | |
| 2012/0078493 | A1 | 3/2012 | Schunder et al. | |
| 2012/0215432 | A1 | 8/2012 | Uyeki | |
| 2013/0304379 | A1 | 11/2013 | Fulger et al. | |
| 2014/0067265 | A1 | 3/2014 | Maston | |
| 2014/0068777 | A1 * | 3/2014 | Piratla | G06F 21/60 726/26 |
| 2014/0163863 | A1 | 6/2014 | Kirsch | |
| 2015/0112919 | A1 | 4/2015 | Weir et al. | |
| 2015/0160025 | A1 | 6/2015 | Konig | |
| 2015/0168175 | A1 | 6/2015 | Abramson et al. | |
| 2015/0195678 | A1 | 7/2015 | Fay et al. | |
| 2015/0198452 | A1 | 7/2015 | Gupta et al. | |
| 2015/0260532 | A1 * | 9/2015 | Sanio | G01C 21/32 701/533 |
| 2015/0292893 | A1 | 10/2015 | Bartsch et al. | |
| 2016/0123748 | A1 | 5/2016 | Chidlovskii | |
| 2016/0366214 | A9 * | 12/2016 | Munemann | H04L 67/306 |
| 2017/0107919 | A1 | 4/2017 | Kim | |
| 2017/0323249 | A1 | 11/2017 | Khasis | |
| 2017/0328725 | A1 | 11/2017 | Schlesinger et al. | |
| 2018/0051997 | A1 * | 2/2018 | Grochocki, Jr. | G01C 21/3415 |
| 2018/0058875 | A1 | 3/2018 | Wan et al. | |
| 2019/0017835 | A1 | 1/2019 | Pickover et al. | |
| 2019/0049259 | A1 | 2/2019 | Galan-Oliveras et al. | |
| 2019/0049262 | A1 | 2/2019 | Grimm et al. | |
| 2019/0113350 | A1 | 4/2019 | Ngu et al. | |
| 2019/0193751 | A1 | 6/2019 | Fernando et al. | |
| 2019/0226864 | A1 | 7/2019 | Miyazaki et al. | |
| 2019/0301880 | A1 * | 10/2019 | Werner | G01C 21/28 |
| 2020/0178221 | A1 * | 6/2020 | Byun | H04W 72/12 |

OTHER PUBLICATIONS

Pantaenius Yacht Insurance "The Benefits of Weather Routing"; Dated Nov. 21, 2013; downloaded from Internet: http://pantaenius.us/en/news-events/news/newsartikel/news/the-benefits-of-weather-routing.html; Mar. 12, 2018; 2 pgs.

Duale, Ali Y. et al. entitled "Road-Condition Based Routing System" U.S. Appl. No. 15/943,791, filed Apr. 3, 2018.

IBM "List of IBM Patents or Patent Applications Treated As Related (Appendix P)"; Filed May 3, 2018, 2 pages.

Moosavi, Sobhan "Characterizing Driving Context from Driver Behavior" SIGSPATIAL '17, Nov. 7-10, 2017, 4 pgs.

Moosavi, Sobhan et al., "Trajectory Annotation by Discovering Driving Patterns", UrbanGIS'17, Nov. 7-10, 2017; 4 pgs.

Werner, John S. et al. entitled "Navigational System Utilizing Local Driver Based Route Deviations" U.S. Appl. No. 15/943,789, filed Apr. 3, 2018.

Zhang, Daqing et al. "iBAT: Detecting Anomalous Taxi Trajectories from GPS Traces"; UbiComp'11, Sep. 17-21, 2011; pp. 99-108.

Ziebart, Brian D. et al., "Navigate Like a Cabbie: Probabilistic Reasoning from Observed Context-Aware Behavior"; UbiComp'08, Sep. 21-24, 2008; pp. 322-331.

* cited by examiner

LOCAL DRIVER PATTERN BASED NOTIFICATIONS

BACKGROUND

The invention relates generally to vehicle navigation and, more specifically, to providing notifications to drivers based on observed local driver patterns.

Increasingly, global positioning systems (GPSs), handheld devices, and online map routing services provide mechanisms to navigate from one point to another by calculating paths based on information derived from roadway maps. These routing services typically have added features to automatically calculate the type of directions desired.

SUMMARY

According to an embodiment, a system for providing notifications to drivers based on observed local driver patterns is provided. The system includes a memory having computer readable computer instructions, and a processor for executing the computer readable instructions. The computer readable instructions include storing, in a database, a number of times that each of a plurality of drivers travels across a road segment. The computer readable instructions also include classifying one or more drivers of the plurality of drivers as local drivers for the road segment based on a determination that the number of times the one or more drivers traversed the road segment is greater than a threshold number and determining an expected driving pattern for the road segment. Based on a determination that a local driver deviated from the expected driving pattern, the computer readable instructions include storing an indication that the local driver deviated from the expected driving pattern and a condition at a time the road segment was traversed. Based on a determination that greater than a threshold percentage of local drivers deviated from the expected driving pattern, the computer readable instructions include notifying a driver traversing the road segment of a variant driving pattern for the road segment.

According to another embodiment, a method for providing notifications to drivers based on observed local driver patterns is provided. The method includes storing, in a database, a number of times that each of a plurality of drivers travels across a road segment. The method also includes classifying one or more drivers of the plurality of drivers as local drivers for the road segment based on a determination that the number of times the one or more drivers traversed the road segment is greater than a threshold number and determining an expected driving pattern for the road segment. Based on a determination that a local driver deviated from the expected driving pattern, the method includes storing an indication that the local driver deviated from the expected driving pattern and a condition at a time the road segment was traversed. Based on a determination that greater than a threshold percentage of local drivers deviated from the expected driving pattern, the method also includes notifying a driver traversing the road segment of a variant driving pattern for the road segment.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes storing, in a database, a number of times that each of a plurality of drivers travels across a road segment. The method also includes classifying one or more drivers of the plurality of drivers as local drivers for the road segment based on a determination that the number of times the one or more drivers traversed the road segment is greater than a threshold number and determining an expected driving pattern for the road segment. Based on a determination that a local driver deviated from the expected driving pattern, the method includes storing an indication that the local driver deviated from the expected driving pattern and a condition at a time the road segment was traversed. Based on a determination that greater than a threshold percentage of local drivers deviated from the expected driving pattern, the method also includes notifying a driver traversing the road segment of a variant driving pattern for the road segment.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
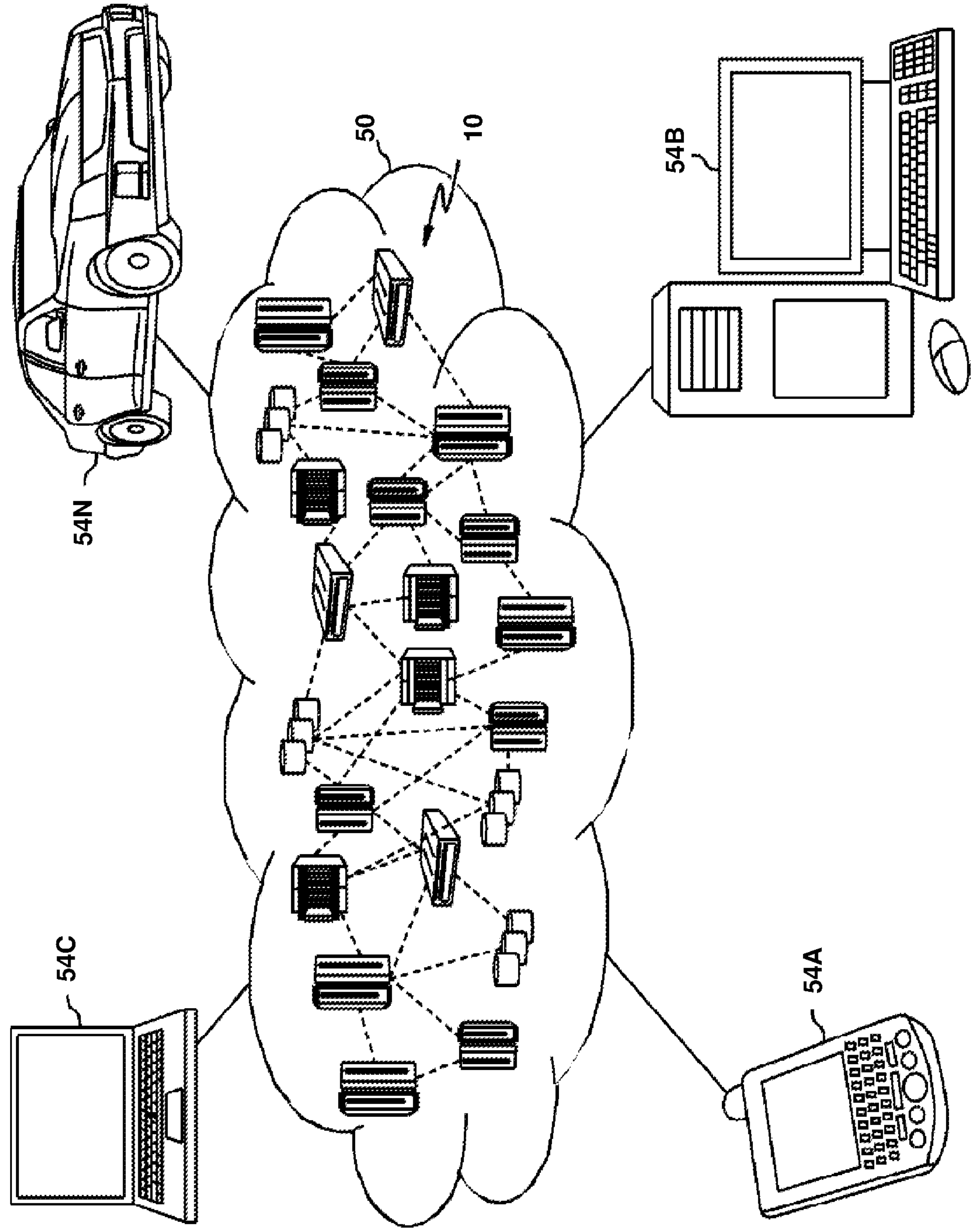
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
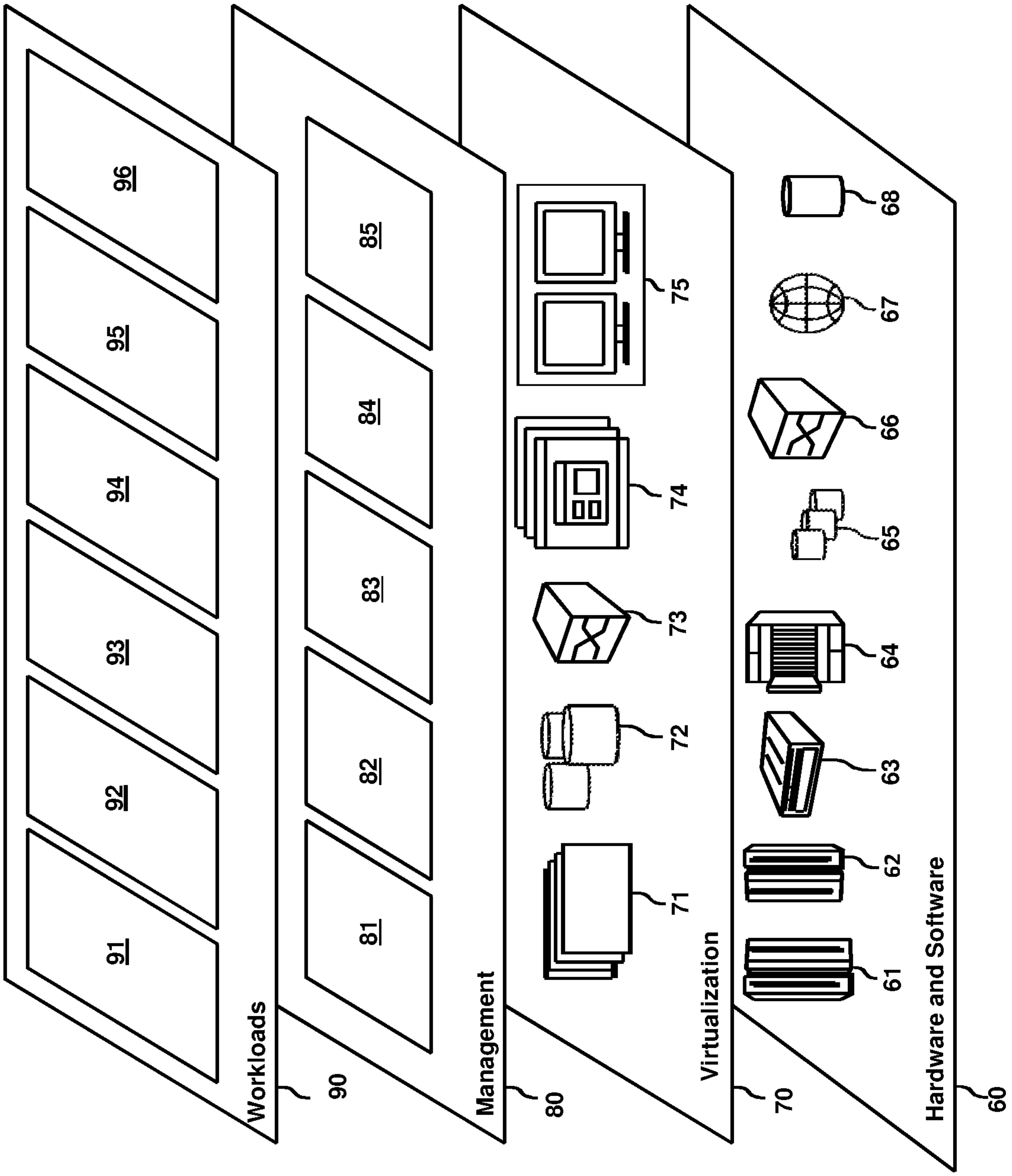
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vehicle routing 96.

Figure 3:
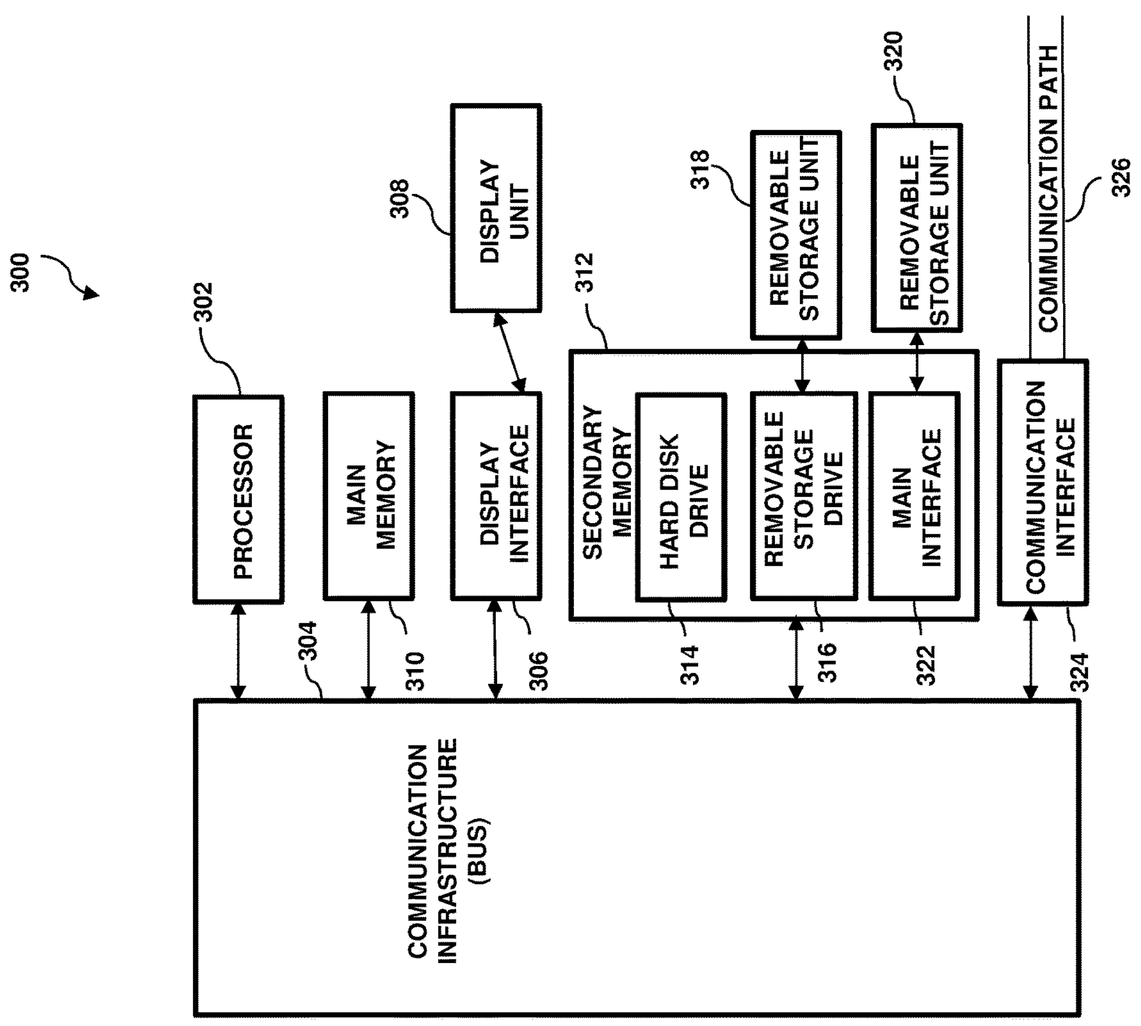
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Navigation systems offer useful directions to drivers who require assistance in locating a desired destination address in an area that is unfamiliar to them or for helping a user in selecting an optimal route to the desired destination address. In addition, vehicle navigation systems typically provide a user with a posted speed limit for various road segments that the user is traversing. This information is useful to drivers that are not familiar with the posted speed limits for roads they are traveling on.

In many cases, local drivers have knowledge of various conditions that cause them to alter their driving patterns from expected driving patterns. For example, a local driver may know that ice on a street melts slowly in one spot and may reduce their speed in that spot after a winter storm. Likewise, a local driver may be aware of a school zone on a certain portion of a road and may reduce their speed in that portion of the road during specific times of the day. In accordance with exemplary embodiments, a system is provided that identifies driving patterns of local drivers that deviate from expected driving patterns and provides notifications to drivers of these deviations.

In exemplary embodiments, drivers are categorized as either local or non-local drivers on a per road segment basis. For example, a local driver may be a driver that has driven on the exact section of road in the current conditions greater than a predefined threshold number of times (e.g., 10 times). Accordingly, a driver may be identified as a non-local driver even though they live in the area if they have not driven on a specific road greater than the threshold number of times. In addition, a driver may be identified as a non-local if they have exceeded the threshold on a given road, but have never been on the road in the current conditions (e.g., snow). Furthermore, a driver may be identified as a non-local if they have exceeded the threshold on a given road, but have not driven on the road in a long time (e.g., 1 year) or if it is known that there has been construction on road since the last time the driver was there (e.g., a lane was closed).

In accordance with exemplary embodiments, a system is provided that monitors the way in which individuals, classified as local drivers, drive on their local roads in certain conditions. The system is configured to extract driving patterns of local drivers that deviate from expected driving patterns and to record the conditions at the time that the behavior was observed. The system stores and analyzes the driving pattern deviations and can provide notifications to drivers based on the observed driving pattern deviations of local drivers in the current conditions. The driving patterns can include the speed at which a driver operated their vehicle, a following distance between the driver's vehicle and the vehicle in front of the driver, and the like.

Figure 4:
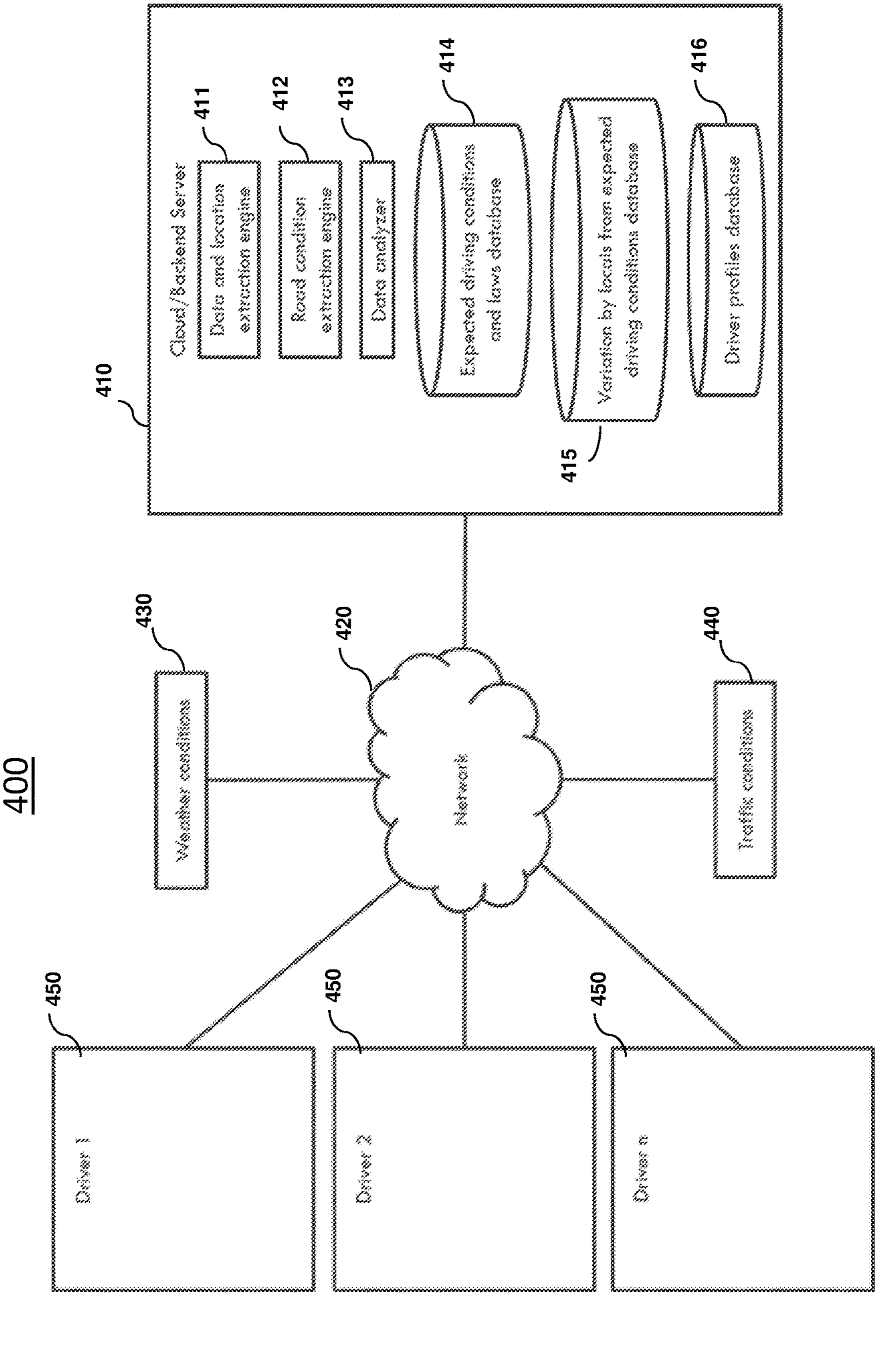
FIG. 4 depicts a system upon which vehicle routing and navigation processes may be implemented according to one or more embodiments of the present invention.

Turning now to FIG. 4, a system 400 upon which the vehicle navigation processes may be implemented will now be described in accordance with an embodiment. The system 400 shown in FIG. 4 includes a server 410, which in turn includes a data and location extraction engine 411, a road condition extraction engine 412, a data analyzer 413, an expected driving conditions and laws database 414, a variation by locals from expected driving conditions database 415, and driver profiles database 416. In exemplary embodiments, the vehicle server 410 may be embodied in a computer system 300, as shown in FIG. 3, or in a cloud based processing system such as shown and described with regards to FIGS. 1 and 2. The system 400 also includes a weather conditions database 430 and a traffic conditions database 440 that are accessible to the server 410 via a communications network 420. The system 400 further includes a plurality of driver's devices 450 that are in communication with the navigational system 410 via the communications network 420. The driver's device 450 may be a user's mobile device or a navigational system built into the vehicle's computer. The communications network 420 may be one or more of, or a combination of, public (e.g., Internet), private (e.g., local area network, wide area network, virtual private network), and may include wireless and wireline transmission systems (e.g., satellite, cellular network, terrestrial networks, etc.). In exemplary embodiments, the driver's device 450 may be integrated with the vehicle diagnostic system and configured to transmit data (e.g., vehicle type, speed, outside temperature, wheel slip, following distance, etc.) and location to the server 410.

The weather conditions database 430 may be any available weather forecasting system that is publicly available such as the service provided by the National Weather Service or the like. In exemplary embodiments, the weather conditions database 430 provides weather forecasts for any requested time period and any requested location. In addition, the weather conditions database 430 stores actual recorded weather data and can provide the weather conditions for requested locations and time periods in the past. The traffic condition database 440 is configured to store data that relates to one or more of the current traffic conditions on roads and the historical traffic data for roads.

Figure 5:
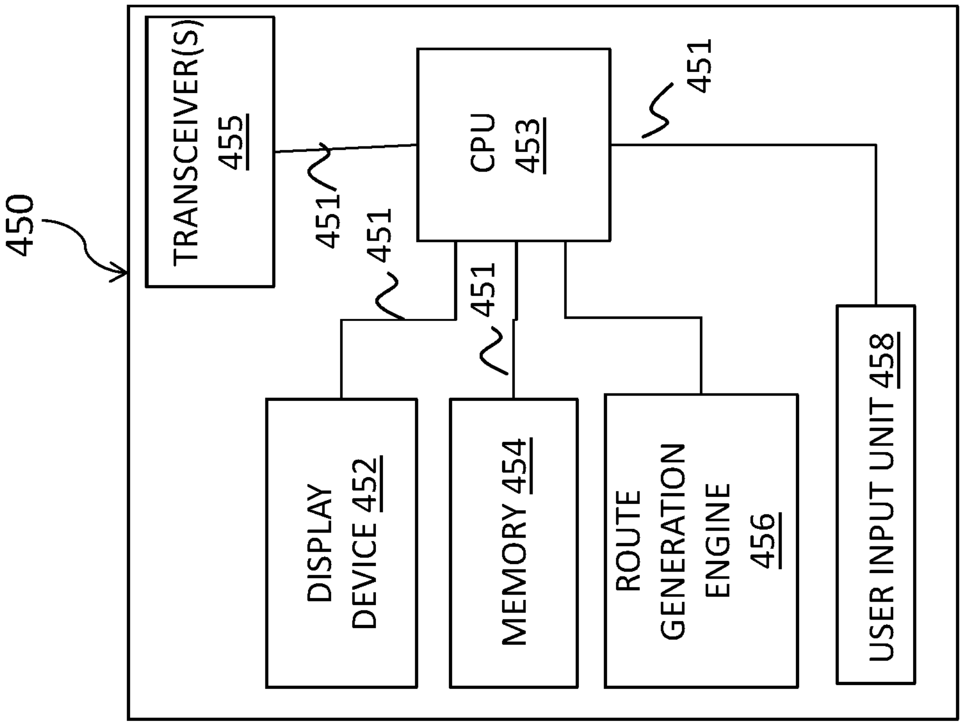
FIG. 5 depicts a driver's device according to one or more embodiments of the present invention.

FIG. 5 illustrates a driver's device 450 in accordance with an embodiment. In an embodiment, the transceiver 455 is configured to receive signals from a global positioning system (GPS) and to communicate with various other systems via the network 420. The processor 453 is configured to receive inputs (e.g., the desired destination location) from a user via the user input unit 458. The processor may also receive input from sensors (not shown) to monitor and report diagnostic data, which can be used to determine the current conditions the vehicle is in. In an embodiment, the processor 453 may be integrated into a vehicle control module such as, for example, an infotainment control module or a navigation control module. The user input unit 458 may be implemented as a keypad, a keyboard, or microphone for allowing a user to input information, such as a destination address. In an embodiment, the display device 452 may be a liquid crystal display (LCD) screen that is used to display graphics and text. The display device 452 displays routes generated by the route generation engine 456. In addition, the display device 452 can display notifications of road conditions and of local driver patterns for the current road to a user.

Although FIG. 5 illustrates the user input unit 458 and the display device 452 as separate components, it is understood that the user input unit 458 and the display device 452 may be a combined unit as well. For example, in an embodiment the display device 452 is a touchscreen that detects the presence and location of a user's touch.

In an embodiment, the memory 454 stores road segments that have previously been driven by a user of the vehicle, the conditions at the time the driver traversed the road segment, and the operating conditions of the vehicle at the time the driver traversed the road segment. The route generation engine 456 includes a mapping tool that takes, as input, a starting location (e.g., address) and a destination location and returns, as output, one or more routes to follow to get from the starting location to the destination location subject to routing objectives. The route generation engine 456 accesses a database of maps (e.g., stored in the memory 454 for generating the routes and also stores previously generated routes). In exemplary embodiments, the processor 453 is configured to communicate with the server 410, shown in FIG. 4, to receive notifications based on deviations from the expected driving patterns by local drivers and to cause the display device to provide the driver with such notifications.

Figure 6:
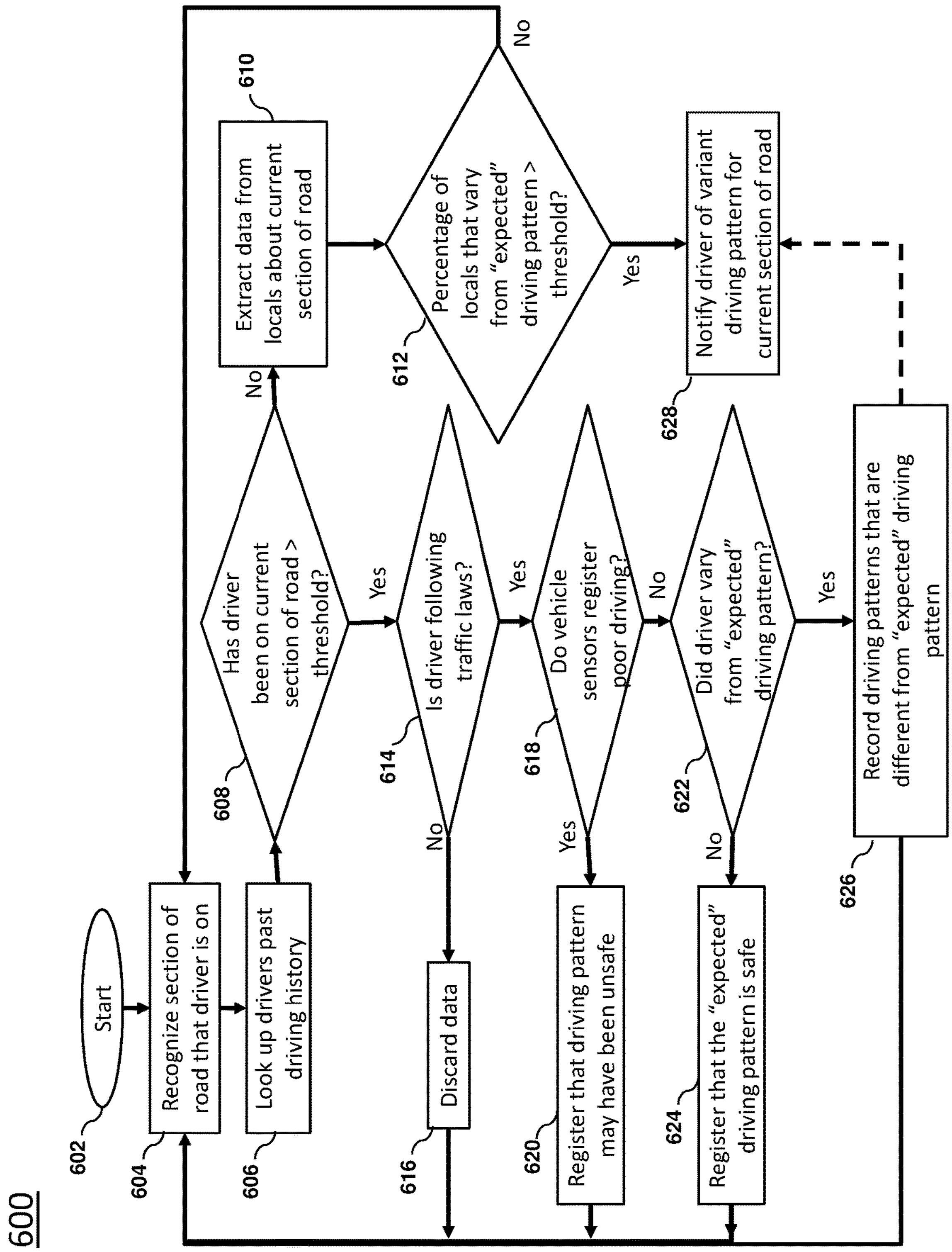
FIG. 6 depicts a flow diagram of a method for classifying a driver as a local or non-local driver and providing notifications to drivers based on observed local driver patterns according to one or more embodiments of the present invention.

Turning now to FIG. 6, a flow diagram of a method 600 for providing notifications to drivers based on observed local driver patterns in accordance with an embodiment is shown. The method 600 begins at block 602 and at block 604 recognizes a segment, or section, or a road that the driver is on. The method may break up a single road into multiple segments such that notifications can be targeted to specific sections of road. Segments may be a specified with fixed or variable lengths (e.g., 100 feet, one quarter of a mile, etc.). The segments can also be compartmented based on their straightness, curves, bends, turns etc. Next, as shown at block 606, the method 600 includes obtaining the driving history of the driver. The driving history of the driver can be stored locally in a user profile or can be stored in a cloud based system, similar to the ones shown in FIG. 1 and FIG. 2. At decision block 608, the method 600 includes determining if the driver has driven the current section of the road greater than a threshold number of times. In exemplary embodiments, the determination can be further based on the number of times that the driver has driven the current section of the road in conditions that are similar to the current conditions. The method may also include checking if the driver has been on impending sections of road greater than a threshold number of times which would give the driver more time to react if a notification is deemed necessary later in the method. If the driver has driven the current or impending section of the road greater than a threshold number of times, the driver is considered to be a local driver and the method 600 proceeds to decision block 614. Otherwise the method 600 proceeds to block 610 where a driver is assumed to be a non-local driver and extracts data from local drivers about the current or impending section of the road. If the percentage of local drivers that have a driving pattern that deviates from an expected driving pattern is greater than a threshold, as shown at decision block 612, the method 600 proceeds to block 628. Otherwise, the method 600 returns to block 604. In exemplary embodiments, the expected driving pattern may be based on posted road signs or it may be the average of all local drivers in ideal conditions (e.g., warm weather, good visibility, road is dry, no traffic, etc.).

Continuing with reference to FIG. 6, as shown at block 614, the method 600 includes determining if the driver is following the traffic laws for the segment of the road. If the driver is following the traffic laws for the segment of the road, the method proceeds to decision block 618 and determines if the vehicle sensors indicate poor, or unsafe, driving (e.g., rapid acceleration, rapid breaking, swerving, wheel slippage, tailgating etc. can all be determined using sensors and cameras that are built into vehicles). If the driver is not following the traffic laws for the segment of the road, the method proceeds to block 616 and discards the data captured for the driver. If the vehicle sensors indicate poor, or unsafe, driving the method proceeds to block 620 and registers that the driving pattern of the driver may have been unsafe.

As shown at decision block 622, if the driver is following traffic laws and vehicle sensors do not register poor or unsafe driving, the method 600 includes determining if the driver deviated from an expected driving pattern. The expected driving pattern may be based on posted road signs or it may be the average of all local drivers in ideal conditions (e.g., warm weather, good visibility, road is dry, no traffic, etc.). In exemplary embodiments, the determination that the driver deviated from the expected driving pattern includes determining that the speed at which the driver traversed the road segment is greater or less than the speed limit for the road segment by at least a predetermined amount. For example, if the driver is going more than five miles per hour less than the speed limit or less than ninety-five percent of the posted speed limit, the driver is considered to have deviated from the expected driving pattern. In addition to the operating speed of the vehicle, the driving pattern can include the following distance of the vehicle. If the driver did not deviate from an expected driving pattern, the method 600 proceeds to block 624 and registers that that the expected driving pattern is safe. Otherwise, as shown at block 626, the method 600 includes recording driving patterns that are different from the expected driving pattern.

As shown at block 628, the method 600 includes notifying the driver of variant driving patterns for the current section of the road. As illustrated by the dashed line, the method 600 may include providing notifications for local drivers or it may return to block 604 without providing the notifications to the local drivers. In one embodiment, the notifications can include making alterations to a display device, such as a navigational screen. In another embodiment, the notifications can include providing a suggested speed to the user via a display device, such as a heads-up display or a driver instrument panel. In a further embodiment, the notifications can include providing audible or tactile feedback to the user (e.g., to indicate that their current speed is in excess of a suggested speed based on that deviation learned from local drivers).

Figure 7:
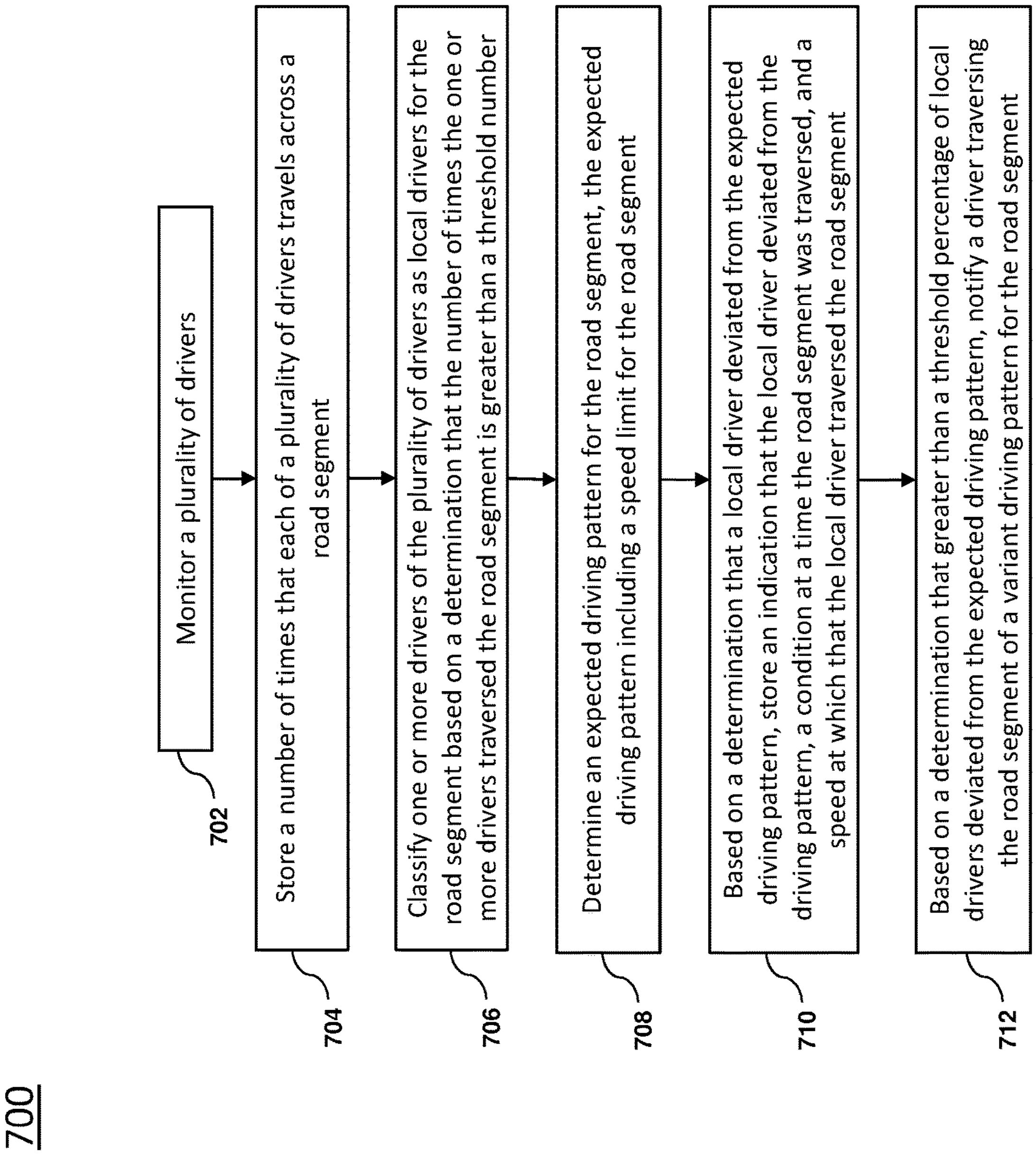
FIG. 7 depicts a flow diagram of a method for providing notifications to drivers based on observed local driver patterns according to one or more embodiments of the present invention.

Turning now to FIG. 7, a flow diagram of a method 700 for providing notifications to drivers based on observed local driver patterns in accordance with an embodiment is shown. As shown at block 702, the method 700 includes monitoring a plurality of drivers. Next, as shown at block 704, the method 700 includes storing, in a database, a number of times that each of a plurality of drivers travels across a road segment. The method 700 also includes classifying one or more drivers of the plurality of drivers as local drivers for the road segment based on a determination that the number of times the one or more drivers traversed the road segment is greater than a threshold number, as shown at block 706.

Next, as shown at block 708, the method 700 also includes determining an expected driving pattern for the road segment, the expected driving pattern including a speed limit for the road segment. In exemplary embodiments, the expected driving pattern includes an average speed at which the plurality of drivers traversed the road segment. Based on a determination that a local driver deviated from the expected driving pattern, the method 700 includes storing an indication that the local driver deviated from the driving pattern, a condition at a time the road segment was traversed, and a speed at which that the local driver traversed the road segment, as shown at block 710. In one embodiment, the determination that the local driver deviated from the expected driving pattern includes determining that the speed at which the local driver traversed the road segment is more than five percent less than the speed limit for the road segment. In exemplary embodiments, the conditions include one or more of a time, a date, a traffic condition, and a weather condition.

Continuing with reference to FIG. 7, as shown at block 712, the method 700 includes notifying a driver traversing the road segment of a variant driving pattern for the road segment based on a determination that greater than a threshold percentage of local drivers deviated from the expected driving pattern. In exemplary embodiments, the method 700 can also include determining a current condition for the road segment and the variant driving pattern can include an average speed that local drivers traversed the road segment in conditions that are the same as the current condition. In exemplary embodiments, classifying the one or more drivers of the plurality of drivers as local drivers for the road segment is further based on a determination that the number of times the one or more drivers traversed the road segment in conditions that are the same as the current condition is greater than the threshold number.

In exemplary embodiments, the data regarding the speed at which the road segment was traversed by a local driver can be discarded based on a determination that the drivers did not obey traffic laws or based on sensor readings that indicate that the driver operated the vehicle in an unsafe manner.

In exemplary embodiments, the data regarding the speed at which the road segment was traversed by a local driver can only be compared to the speed at which other drivers are driving in similar vehicles. For example, local drivers in sports cars may drive much slower in bad weather than local drivers in all-wheel drive SUV's. Furthermore, the time of the year that the drivers are operating the vehicles can be used to determine the driving patterns. For example, a local driver coming home from work may drive slower in the winter because the sun sets earlier and it is dark when they are going home versus the summer when it is light out and they may drive a little faster (but still within the speed limit).

In exemplary embodiments, hotspots could be used such that only portions of roads that are deemed necessary are monitored to minimize overall computations (e.g., if users typically don't deviate from the expected pattern no matter what the conditions are on a straight portion of a road or that non-locals with no notification typically follow the same patterns as locals, it may be determined that the data has little impact and monitoring on that section of road is no longer necessary). In one embodiment, a driver may be able to select a specific driver's profile that is local to an area to learn from (e.g., a new driver may be able to select their parent's (or guardian's) profile such that they can learn to drive from their parent on roads that the parent is a local on even if their parent is not with them (e.g., parent is at work)).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for providing notifications to drivers based on observed local driver patterns, comprising:

a memory having computer readable instructions; and a processor for executing the computer readable instructions, the computer readable instructions including:

storing, in a database, a number of times that each of a plurality of drivers travels across a road segment;

classifying one or more drivers of the plurality of drivers as local drivers for the road segment based on a determination that the number of times the one or more drivers traversed the road segment is greater than a threshold number;

determining an expected driving pattern for the road segment;

based on a determination that a local driver deviated from the expected driving pattern, storing an indication that the local driver deviated from the driving pattern and a condition at a time the road segment was traversed, wherein the determination that the local driver deviated from the expected driving pattern includes determining that a speed at which the local driver traversed the road segment is more than a fixed percent below a speed limit for the road segment; and based on a determination that greater than a threshold percentage of local drivers deviated from the expected driving pattern, notifying a driver traversing the road segment of a variant driving pattern for the road segment, wherein the notification is not provided to the driver traversing the road segment based on a determination that the driver is a local driver for the road segment.

2. The system of claim 1, wherein the expected driving pattern includes one of an average speed at which the plurality of drivers traversed the road segment or a speed limit for the road segment.

3. The system of claim 1, wherein the condition includes one or more of a time, a date, a traffic condition, and a weather condition.

4. The system of claim 1, wherein data regarding a speed at which the road segment was traversed by a local driver is discarded based on a determination that the drivers did not obey traffic laws.

5. The system of claim 1, wherein the computer readable instructions include determining a current condition for the road segment and wherein the variant driving pattern includes an average speed that local drivers traversed the road segment in conditions that are the same as the current condition.

6. The system of claim 5, wherein classifying the one or more drivers of the plurality of drivers as local drivers for the road segment is further based on a determination that the number of times the one or more drivers traversed the road segment in conditions that are the same as the current condition is greater than the threshold number.

7. A method for providing notifications to drivers based on observed local driver patterns, comprising:

storing, in a database, a number of times that each of a plurality of drivers travels across a road segment;

classifying one or more drivers of the plurality of drivers as local drivers for the road segment based on a determination that the number of times the one or more drivers traversed the road segment is greater than a threshold number;

determining an expected driving pattern for the road segment;

based on a determination that a local driver deviated from the expected driving pattern, storing an indication that the local driver deviated from the driving pattern and a condition at a time the road segment was traversed, wherein the determination that the local driver deviated from the expected driving pattern includes determining that a speed at which the local driver traversed the road segment is more than a fixed percent below a speed limit for the road segment; and based on a determination that greater than a threshold percentage of local drivers deviated from the expected driving pattern, notifying a driver traversing the road segment of a variant driving pattern for the road segment, wherein the notification is not provided to the driver traversing the road segment based on a determination that the driver is a local driver for the road segment.

8. The method of claim 7, wherein the expected driving pattern includes one of an average speed at which the plurality of drivers traversed the road segment or a speed limit for the road segment.

9. The method of claim 7, wherein the condition includes one or more of a time, a date, a traffic condition, and a weather condition.

10. The method of claim 7, wherein data regarding a speed at which the road segment was traversed by a local driver is discarded based on a determination that the drivers did not obey traffic laws.

11. The method of claim 7, further comprising include determining a current condition for the road segment and wherein the variant driving pattern includes an average speed that local drivers traversed the road segment in conditions that are the same as the current condition.

12. The method of claim 11, wherein classifying the one or more drivers of the plurality of drivers as local drivers for the road segment is further based on a determination that the number of times the one or more drivers traversed the road segment in conditions that are the same as the current condition is greater than the threshold number.

13. A computer program product comprising a computer readable storage medium having program instructions embodied therewith the program instructions executable by a computer processor to cause the computer processor to perform a method, comprising:

storing, in a database, a number of times that each of a plurality of drivers travels across a road segment;

classifying one or more drivers of the plurality of drivers as local drivers for the road segment based on a determination that the number of times the one or more drivers traversed the road segment is greater than a threshold number;

determining an expected driving pattern for the road segment;

based on a determination that a local driver deviated from the expected driving pattern, storing an indication that the local driver deviated from the expected driving pattern and a condition at a time the road segment was traversed, wherein the determination that the local driver deviated from the expected driving pattern includes determining that a speed at which the local driver traversed the road segment is more than a fixed percent below a speed limit for the road segment; and based on a determination that greater than a threshold percentage of local drivers deviated from the expected driving pattern, notifying a driver traversing the road segment of a variant driving pattern for the road segment, wherein the notification is not provided to the driver traversing the road segment based on a determination that the driver is a local driver for the road segment.

14. The computer program product of claim 13, wherein the expected driving pattern includes one of an average speed at which the plurality of drivers traversed the road segment or a speed limit for the road segment.

15. The computer program product of claim 13, wherein the condition includes one or more of a time, a date, a traffic condition, and a weather condition.

16. The computer program product of claim 13, wherein data regarding a speed at which the road segment was traversed by a local driver is discarded based on a determination that the drivers did not obey traffic laws.

17. The computer program product of claim 13, wherein the method further includes determining a current condition for the road segment and wherein the variant driving pattern includes an average speed that local drivers traversed the road segment in conditions that are the same as the current condition.

18. The computer program product of claim 17, wherein classifying the one or more drivers of the plurality of drivers as local drivers for the road segment is further based on a determination that the number of times the one or more drivers traversed the road segment in conditions that are the same as the current condition is greater than the threshold number.

* * * * *